United States Patent
Grisoni

(10) Patent No.: US 6,596,216 B2
(45) Date of Patent: Jul. 22, 2003

(54) PROCESS FOR MAKING PRECISION TWEEZERS WITH TIPS ATTACHED TO THE TINES

(75) Inventor: Franco Grisoni, Vacallo (CH)

(73) Assignee: Ideal-Tek S.A., Balerna (CH)

( * ) Notice: Subject to any disclaimer, the term of this patent is extended or adjusted under 35 U.S.C. 154(b) by 57 days.

(21) Appl. No.: 09/824,202

(22) Filed: Apr. 3, 2001

(65) Prior Publication Data

US 2001/0026074 A1 Oct. 4, 2001

(30) Foreign Application Priority Data

Apr. 3, 2000 (CH) ............................................. 0655/00

(51) Int. Cl.[7] .............................................. B29C 45/00
(52) U.S. Cl. ...................... 264/273; 294/99.2; 403/265; 264/328.1
(58) Field of Search ........................... 294/7, 8, 32, 33, 294/56, 57, 106, 99.2, 902; 30/324, 343; 264/105, 273, 299, 328.1; 403/265, 267, 269

(56) References Cited

U.S. PATENT DOCUMENTS

| | | | | |
|---|---|---|---|---|
| 2,382,304 A | * | 8/1945 | Foltz et al. | .................... 30/343 |
| 3,677,112 A | * | 7/1972 | Keniston | .................. 294/99.2 |
| 3,735,426 A | * | 5/1973 | Horvath | ................ 294/99.2 X |
| 4,335,068 A | * | 6/1982 | Hemery | ............... 264/328.1 X |
| 4,707,922 A | * | 11/1987 | Hosak-Robb | .......... 294/99.2 X |
| 5,376,325 A | * | 12/1994 | Ormson | ................. 264/273 X |
| 5,397,608 A | * | 3/1995 | Soens | ..................... 264/105 X |
| 5,899,513 A | * | 5/1999 | Grisoni | ...................... 294/99.2 |

* cited by examiner

Primary Examiner—Dean J. Kramer
(74) Attorney, Agent, or Firm—Young & Thompson

(57) ABSTRACT

A grip with two tines is constructed by making one or more through holes at the end of each tine. A single mold is constructed that reproduces both shaped tips of the tines. At least the ends of the two tines are introduced into the mold and locked in position in which the shaped tips are to be attached to the tines. A synthetic resin is injected into the mold and forms the two shaped tips surrounding the ends of the two tines and encompassing them, and filling the holes.

4 Claims, 2 Drawing Sheets

FIG.4
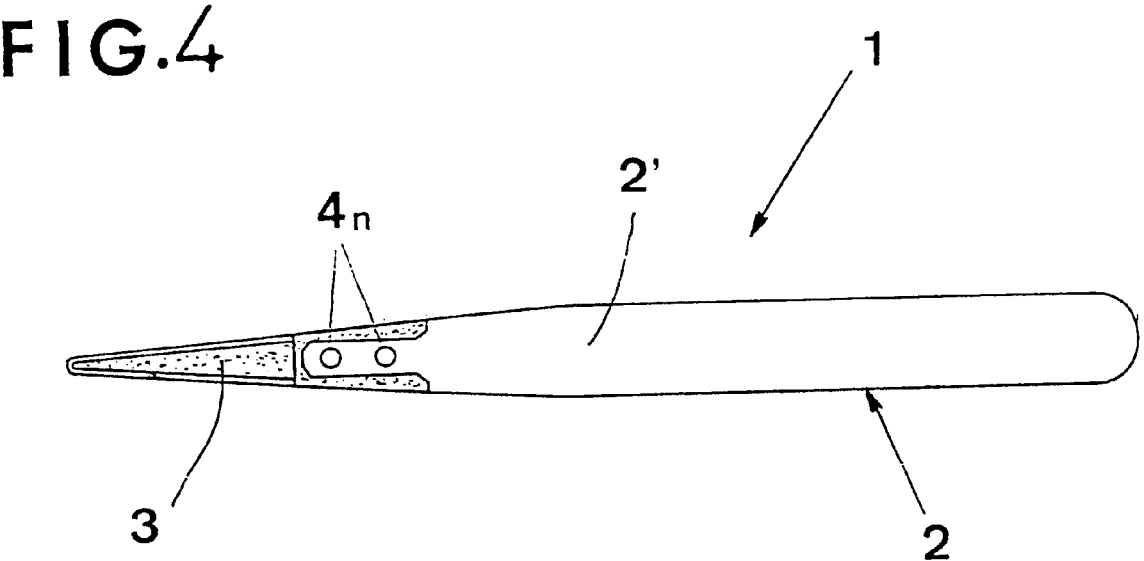
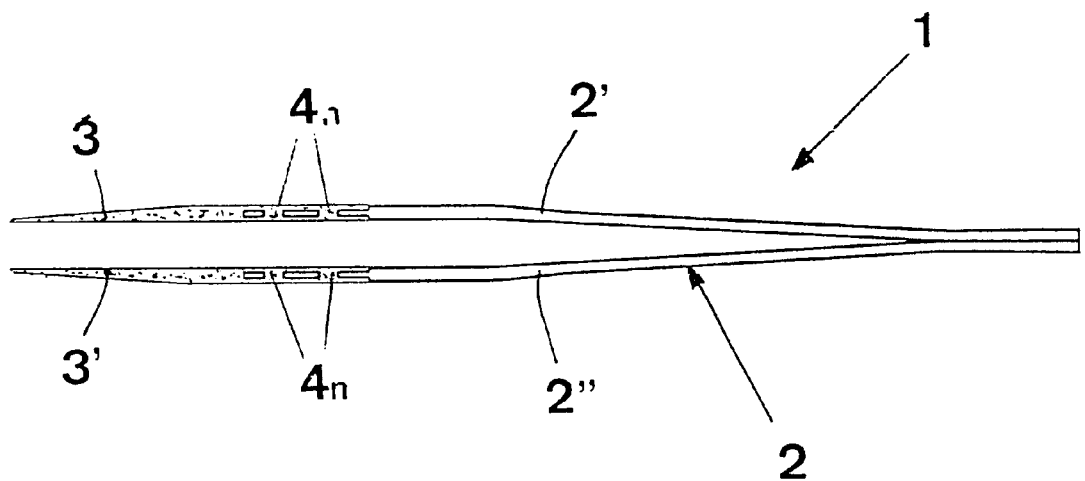
FIG.5

PROCESS FOR MAKING PRECISION TWEEZERS WITH TIPS ATTACHED TO THE TINES

FIELD OF THE INVENTION

This invention pertains to the field of technology that deals with the production of precision tweezers and, in particular, it refers to the sector thereof that is devoted to the production of precision tweezers that are made up of a grip and two tines, to whose ends tips are attached that are shaped in such a way as to be able to perform their specific functions.

BACKGROUND OF THE INVENTION

The idea of attaching tips to a grip makes it possible, as one skilled in the art knows, first to produce the shaped tips with greater precision and accuracy since they are used to form the grip and, secondly, to make the shaped tips out of materials that are different from those used for the grip and that have completely different physical characteristics. It is not uncommon, for example, to encounter cases where a metal grip that has optimum bending strength and elevated fatigue resistance is equipped with shaped tips made of synthetic resin that are attached to the ends of its two tines.

By properly selecting the type of synthetic resin, it is possible to make said tips in a way that is better suited to the kinds of operations that they are intended to perform.

According to the current state of the art, known shaped tips are attached to the ends of the tines by threaded or other means that make it possible to align them accurately with the axes of the tines.

One such attachment method is described in patent U.S. Pat. No. 5,899,513 of this claim.

Moreover, these methods require positioning operations that are very precise and are therefore quite costly in order to produce such attachment means with the absolute minimum of errors and/or tolerances, but they do not achieve the best possible results in terms of precision owing to the fact that, at times, cumulative errors that are present in the various parts that are to be assembled build up in a set of tweezers.

SUMMARY OF THE INVENTION

The inventor of this invention has therefore devised a process that makes it possible to reduce to a minimum the inaccuracies involved in the production of precision tweezers, thereby limiting the costs of the necessary operations.

The inventor has devised a process that is new because, as far as he is aware, said synthetic-resin tips are mated by means of die-casting, covering the two ends of the tips that are inserted into a single mold and are firmly attached thereto.

The object of this invention is a process for making precision tweezers.

Another object of the invention is precision tweezers that can be produced by the process of the invention.

A more detailed description will now be given of a preferred embodiment of the process of the invention, but said example is neither binding nor limiting with regard to other implementations of the process that one skilled in the art could implement based on the teachings of the claimed invention.

BRIEF DESCRIPTION OF THE DRAWINGS

In this description reference will be made to the attached drawings, where:

FIG. 4 shows a top view of a set of precision tweezers after the shaped tips are attached;

FIG. 5 shows a side view.

DETAILED DESCRIPTION OF THE INVENTION

Figure 2:
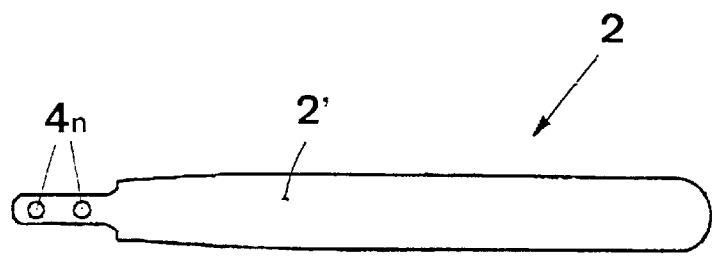
FIG. 2 shows a top view of the single grip of the precision tweezers of FIG. 1.
Figure 3:
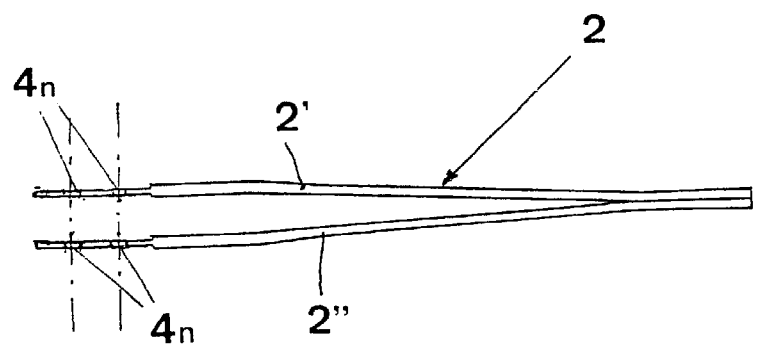
FIG. 3 shows a side view.

FIGS. 2, 3 show how a grip 2 produced according to known methods encompasses two appropriately designed tines 2', 2" at whose ends, according to the process of the invention, two through holes 4n are made (clearly, the number of said holes 4n can vary, depending on requirements).

Figure 1:
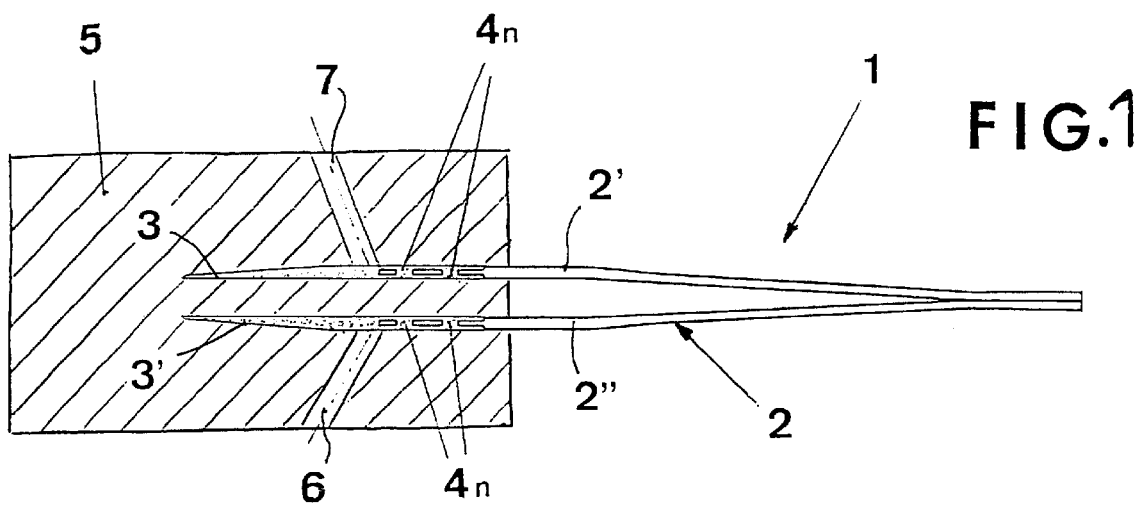
FIG. 1 shows a schematic of the longitudinal section of a mold in which the shaped tips and tines of a set of precision tweezers according to the invention are mated.

FIG. 1 shows then how said grip 2 is inserted into a mold 5 that reproduces two shaped tips 3, 3', at the exact locations where the tips themselves are to be attached thereto.

By injecting into the mold 5, a synthetic resin in the liquid state through one or more inlets 6, 7, said resin forms two shaped tips 3, 3', encompassing the two ends of tines 2', 2" and flowing through said holes 4n, in such a way that shaped tips 3, 3' wind up being perfectly positioned with respect to grip 2 and are firmly connected to it because of passing through above-mentioned holes 4n.

This produces a set of precision tweezers with all of the elements that comprise it in exactly the right locations, and does so through a single molding operation, thereby achieving the goals that the inventor had set himself.

To implement the process of the invention and to produce the precision tweezers that can be obtained thereby, it is possible to use all of the synthetic resins that are known to one skilled in the art and that have physical-chemical characteristics that are best suited to their specific functions.

The inventor further suggests that shaped tips 3, 3' be made of a polymer or copolymer synthetic resin that may be "charged" with fibers that alter its physical characteristics.

In order to obtain shaped tips 3, 3' with optimum mechanical resistance and good resistance to abrasion, it is possible to use, e.g., polymer or copolymer resins that are charged with glass fibers, while to make shaped tips 3, 3' that are especially well-suited for operations to be carried out on electrical and/or electronic circuits, even those under voltage, the inventor suggests that a polymer or copolymer resin charged with carbon fibers and/or carbon powder be used so as to make the resin "dissipative", i.e., slightly conductive in order to discharge it without sparks from electrostatic charge and/or electric current.

The ideal resistivity value that is to be imparted to the material of said shaped tips are made should, according to the inventor, be around $10^7$–$10^9$ ohm.

What is claimed is:

1. A process for making a set of precision tweezers, which includes a grip with two tines, to each of which is attached a shaped tip, the process comprising the steps of:

a) constructing said grip by making at least one hole at an end of each tine;

b) constructing a single mold that reproduces both said shaped tips;
c) introducing at least said ends of said two tines into said mold; and
d) injecting a synthetic resin into said mold to form said two shaped tips, surrounding the ends of said two tines and encompassing said ends, and filling said holes.

2. The process according to claim 1, wherein said synthetic resin is selected from the group consisting of a polymer resin and a copolymer resin, and injecting said synthetic resin at a temperature of 270–280° C.

3. The process according to claim 2, wherein said synthetic resin contains glass fibers.

4. The process according to claim 2, wherein said synthetic resin contains at least one of carbon fibers and carbon powder to produce an electrical resistivity value of between $10^7$–$10^9$ ohm.

* * * * *